(12) United States Patent
Hamilton, II et al.

(10) Patent No.: US 7,865,460 B2
(45) Date of Patent: Jan. 4, 2011

(54) METHOD AND SYSTEM FOR DATA DISPATCH

(75) Inventors: Rick A. Hamilton, II, Charlottesville, VA (US); Jenny S. Li, Danbury, CT (US); Vivek Salve, Poughkeepsie, NY (US); Anne R. Sand, Peyton, CO (US); Elisabeth R. Stahl, Shaker Heights, OH (US)

(73) Assignee: International Business Machines Corporation, Armonk, NY (US)

( * ) Notice: Subject to any disclaimer, the term of this patent is extended or adjusted under 35 U.S.C. 154(b) by 419 days.

(21) Appl. No.: 12/117,285

(22) Filed: May 8, 2008

(65) Prior Publication Data

US 2009/0282090 A1 Nov. 12, 2009

(51) Int. Cl.
G06F 7/00 (2006.01)
G06F 17/00 (2006.01)
G06F 17/30 (2006.01)

(52) U.S. Cl. .................. 707/609; 707/636; 707/809

(58) Field of Classification Search ............. 707/609, 707/602, 636, 694, 809, 812
See application file for complete search history.

(56) References Cited

U.S. PATENT DOCUMENTS

| 5,313,631 | A | 5/1994 | Kao |
| 6,732,241 | B2 | 5/2004 | Riedel |
| 6,775,673 | B2 | 8/2004 | Mahalingam et al. |
| 6,789,115 | B1 | 9/2004 | Singer |
| 6,915,287 | B1 | 7/2005 | Felsted |
| 7,409,651 | B2 * | 8/2008 | Berger et al. ........... 716/3 |
| 2002/0107871 | A1 | 8/2002 | Wyzga et al. |
| 2002/0161784 | A1 | 10/2002 | Tarenskeen |
| 2005/0125463 | A1 | 6/2005 | Joshi |
| 2005/0251802 | A1 | 11/2005 | Bozek et al. |
| 2005/0268121 | A1 | 12/2005 | Rothman |
| 2006/0080371 | A1 | 4/2006 | Wong et al. |
| 2006/0167883 | A1 | 7/2006 | Boukobza |
| 2006/0235899 | A1 | 10/2006 | Tucker |
| 2007/0011209 | A1 | 1/2007 | Wietlisbach et al. |
| 2007/0130234 | A1 | 6/2007 | Ikegaya |
| 2007/0136392 | A1 | 6/2007 | Oh et al. |
| 2007/0150488 | A1 | 6/2007 | Barsness et al. |

FOREIGN PATENT DOCUMENTS

EP    1 215 590 A2    6/2002

* cited by examiner

*Primary Examiner*—Wilson Lee
*Assistant Examiner*—Merilyn P Nguyen
(74) *Attorney, Agent, or Firm*—George R. McGuire; Bond Schoeneck & King, PLLC

(57) ABSTRACT

A method and system for migrating source data from one or more databases to a destination database, wherein the destination database is selected based on power consumption of the destination database. A data migration server determines which destination database should be selected by selecting a number of candidates and comparing the power consumed, the available space and the maximum monthly power consumption limit. A user intervention policy is created to evaluate which data should be moved to a destination database. A "payback period" is calculated to determine the amount of time that will elapse before savings are realized.

21 Claims, 2 Drawing Sheets

METHOD AND SYSTEM FOR DATA DISPATCH

BACKGROUND OF THE INVENTION

The present invention relates generally to energy efficiency across the data center, and more particularly to the migration of data based on power consumption.

Energy efficiency across the entire data center is becoming a top concern for corporations around the world. This problem requires consideration of all energy efficiency components of the data center, from component levels through server and system levels, and concluding with the complete data center. At the system level, storage devices are an extremely important part of the equation, which needs to be analyzed. Disk systems can require substantial amounts of power to operate and cool, and in many cases, can require more power than the server itself.

Data migration is the process of transferring data between storage types, formats or computer systems. Data migration is usually performed programmatically to achieve an automated migration, freeing up human resources from tedious tasks. It is required when organizations or individuals change computer systems or upgrade to new systems, or when systems merge (such as when the organizations that use them undergo a merger/takeover).

To achieve an effective data migration procedure, data on the old system is mapped to the new system providing a design for data extraction and data loading. The design relates old data formats to the new system's formats and requirements. Programmatic data migration may involve many phases but it minimally includes data extraction where data is read from the old system and data loading where data is written to the new system.

After loading into the new system, results are subjected to data verification to determine that data was accurately translated, is complete, and supports processes in the new system. During verification, there may be a need for a parallel run of both systems to identify areas of disparity and forestall erroneous data loss. Automated and manual data cleansing is commonly performed in migration to improve data quality, eliminate redundant or obsolete information, and match the requirements of the new system. Data migration phases (design, extraction, cleansing, load, verification) for applications of moderate to high complexity are commonly repeated several times before the new system is activated.

Traditional data migration involves business decisions from application owners and IT administrators to predefine a destination database that usually resides physically on another disk for each given source database. Very often, such migration is a one to one relationship where a source database is mapped to a predefined destination database This migration process is done at a database level that involves no concerns on how data is being used by applications and how it relates to power consumption.

Reference is made to FIG. 1, which illustrates a traditional database migration process 10. Database A at 12 and Database B at 14 are source databases containing data that can be migrated to another storage database. Migration routines, cleansing routines and indexing strategies are created by application owners. IT administrators then determine the physical location of the destination database. The source data from Database A is moved to Staging Database A at 16 and source data from Database B is moved to Staging Database B at 18. Cleansing scripts are applied to the data on Staging Database A and to the data on Staging Database B. An index is then created for the data on Staging Database A and for the data on Staging Database B. Each set of data from Staging Database A and Staging Database B is migrated to a destination database 20, which is Database 1 in the Figure. The data from Staging Database A and Staging Database B must be merged with each other and with any existing data on Database 1. In these prior art methods, the destination database is predefined when it enters the system. As data comes in, it is written to the designated source, not taking into account the amount of power that may used in the destination database. Current data assignment does not provide any intelligent decision making around selecting the optimal location, considering energy efficiency and other requirements.

It is a primary object of the invention to provide a method and system for dispatching data based on power conservation. It is another object of the invention to provide a method and system for selecting the destination database based on energy efficiency. It is a further object of the invention to provide a method and system for indexing the dispatched data for fast and easy retrieval.

SUMMARY OF THE INVENTION

These and other objects and advantages are accomplished by a method for receiving source data from one or more databases and dispatching it to a destination database, wherein the destination database is selected based on power efficiency. Specifically, the method of the present invention determines which destination database should be selected by selecting a number of candidates and comparing the power consumed, the available space and other predefined criteria. In one aspect of the method of the invention, incoming data may be fragmented and sent to different destinations. An index is created for each dataset that is dispatched so the retrieval and recombining of fragmented data is made easy.

In accordance with another embodiment, a system is provided for receiving source data from one or more databases and dispatching it to a destination database, wherein the destination database is selected based on power efficiency of the destination database. Specifically, the system of the present invention includes a number of target or destination databases, which are analyzed for power efficiency, available space and other predefined criteria. In one aspect of the system of the invention, incoming data is received and may be fragmented and sent to different destinations. An index is created for each dataset that is dispatched so the retrieval and recombining of fragmented data is made easy.

BRIEF DESCRIPTION OF THE DRAWINGS

The present invention will be more fully understood and appreciated by reading the following Detailed Description in conjunction with the accompanying drawings, in which.

DETAILED DESCRIPTION

As will be appreciated, the present invention provides an effective method for reducing energy consumption of certain types of computer systems. The data dispatch process is enhanced by using power consumption as a guiding factor in determining how data in the source database can be assigned real time to a destination database to maintain a desirable power consumption level.

Figure 1:
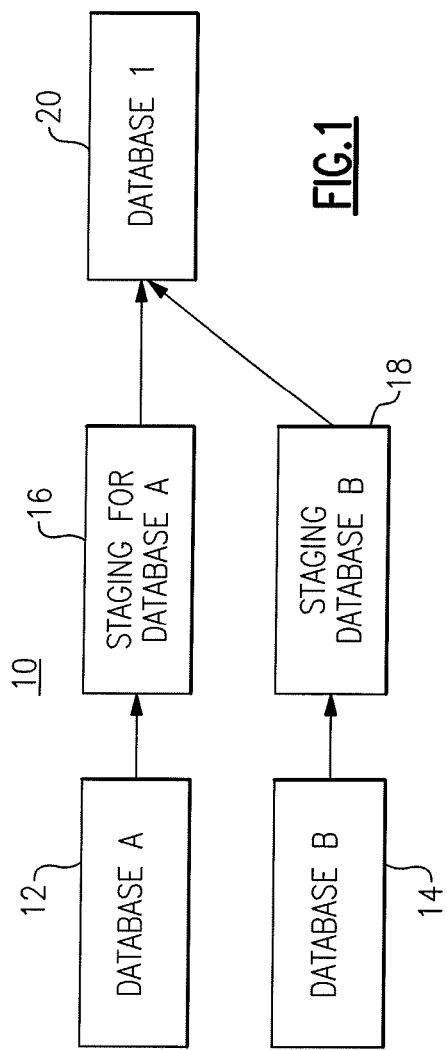
FIG. 1 is a schematic view of a prior art data migration system.
Figure 2:
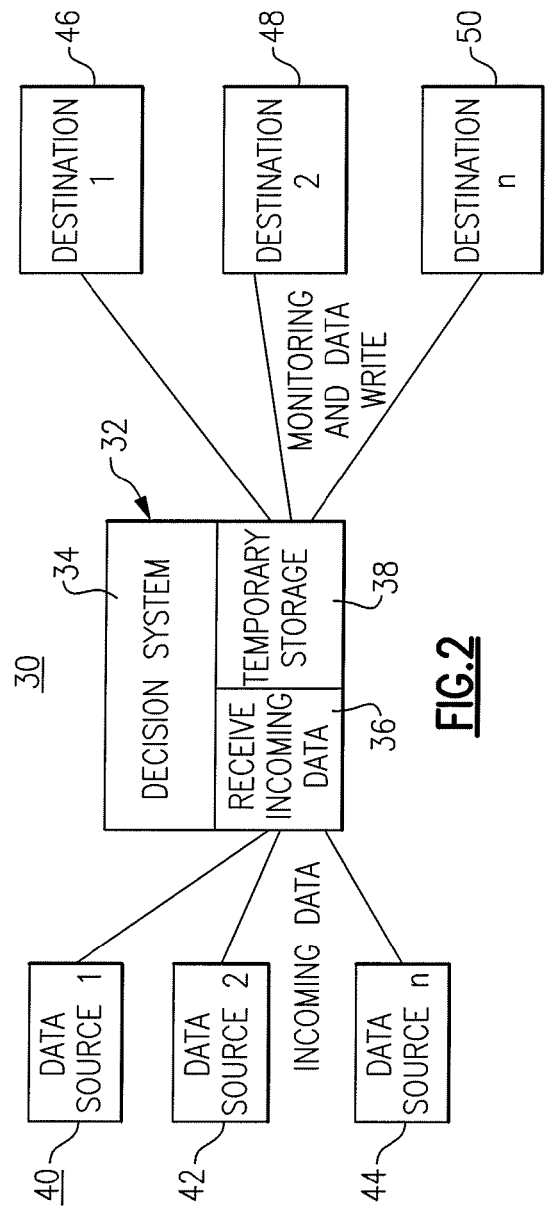
FIG. 2 is a schematic view of the data dispatch system of the present invention.

FIG. 2 diagrammatically illustrates an exemplary system 30 in which various embodiments according to the invention, described herein below, may operate. The main component of the system is a data dispatch server (DDS) 32. DDS 32 includes a decision system 34, a facility for receiving incoming data 36 and a temporary storage device 38, such as a magnetic disk or an optical disk.

Three separate sets of data, 40, 42 and 44 are shown incoming to system facility 36. The number of data sets is not limited and any number of data sets may be input into DDS 32 as long as the storage needs can be met. Decision system 34 of DDS 32 controls the decision process and the management of data needed to be dispatched based on energy efficiency characteristics. Data 40, 42 and 44 are received in facility 36 and temporarily held in storage device 38 until a decision is made by decision system 32, as to which destination database to migrate the data. System 30 includes three destination databases 46, 48 and 50, for migration of data 40, 42 and 44. The number of destination databases is not limited, and may be as many as the system can maintain. Moreover, new destination databases may be added to the candidates from time to time, as they become available.

DDS 32 handles the mapping of data from a staging database, such as temporary storage device 42 to a destination database, such as destination database 46, 48 or 50. Database migration tools currently exist in the prior art, which allow administrators to migrate a database from staging server 38 to a destination server 46, 48 or 50 via a graphical user interface (GUI), instead of writing script language for the process. Although the currently available migration tools facilitate the actual migration of data, it is decision system 34 of DDS 32, which calculates the size of data to be moved and determines the best candidate for the destination database.

In one aspect of the present invention, DDS 32 locates the most energy efficient location for a given set of data. After DDS 32 determines the best location for a given set of data, the data is written to the destination and migrated there. It will not need to be relocated unless another destination becomes available with more desirable energy efficiency characteristics than the currently selected destination.

In another aspect of the present invention, after data has been migrated to the preferred destination, system 30 monitors the destination databases for storage capacity. As the most energy efficient destination storage facility reaches its capacity, or becomes unavailable, it may be necessary to migrate subsequent incoming data to a different location. The subsequent incoming data may be related to already-migrated data. The inability to migrate the subsequent incoming data to the same destination database as the related data may cause the data to become fragmented. DDS 32 will keep an index of the location where all the data is stored so that it can be located and recombined upon retrieval.

In yet another aspect of the present invention, the most energy efficient database may not have enough available space to hold an entire dataset. DDS 32 may fragment the data and send a portion to the most energy efficient database and send the rest to the next most energy efficient database. Since an index is created for each set of dispatched data, retrieval and recombining of the fragmented data is not a problem.

Part of the decision process performed by decision system 34 involves the monitoring of the power consumption level of each destination database candidate.

Decision system 34 of DDS 32 must also gather usage and requirements of the incoming data. These can be identified by answering a set of queries, categorizing the answers and creating tags. DDS 32 will compare the tags of the incoming data with the tags of the stored data in the candidate destinations.

DDS 32 executes dispatch policies, including the control of reference data, schema configuration, merges of data and the like. As an added benefit, DDS 32 can perform a predictive data dispatch decision-making process to predict when data may arrive. This aspect will be discussed more specifically below.

As data enters DDS 32, DDS 32 identifies the incoming data and determines whether it is (a) real-time data; (b) near-real-time data; or (3) non-real-time data. Real-time data denotes information that is delivered immediately after collection. There is no delay in the timeliness of the information provided Near-real-time pertains to the delay introduced by automated data processing or network transmission between the occurrence of an event and the use of the processed data, such as, for display or feedback and control purposes. For example, a near-real-time display depicts an event or situation as it existed at the current time less the processing time. The distinction between near real time and real time varies and the delay is dependent on the type and speed of the transmission. Non-real time data has no time-constraints for delivery of data. It is often used for lower-priority data.

After it has identified the type of data it has received, DDS 32 determines if the data should be dispatched immediately. Real-time and near-real time data should preferably be dispatched immediately, while non-real time data may be retained. If data is retained and does not need to be dispatched right away, DDS 32 must determine an acceptable duration of time for storing data in temporary staging system 38.

Next, DDS 32 determines the best option or candidate from the list of available destinations for migration of the data. Data is then dispatched to the selected destination.

DDS 30 may select candidates for destination databases either through manual entry or through automatic discovery. After a list of candidates has been created, DDS 32 will monitor the status of the destination candidates to ensure that they are available for writing and must also maintain information about their current energy efficiency characteristics. Monitoring by DDS 32 may be conducted (a) at regular intervals; (b) proactively when DDS 32 predicts a data write may be incoming; or (c) when data has come to DDS 32 and needs to be written.

DDS 32 and destination candidates may communicate via any known or future protocol or by an application programming interface (API). In some cases, it is not best to simply dispatch data as it enters DDS 32. If DDS 32 believes that more related data will be incoming shortly, it may temporarily store data, aggregate it, and write it altogether. Conversely, if a large amount of data enters DDS 32, DDS 32 may divide it and write a portion of it to an efficient destination that has only limited space. When the dispatch of data is delayed, incoming data is stored in temporary staging location 42 for a short period of time before it is dispatched.

Although energy efficiency is becoming more important, in most cases businesses want to make an intelligent decision about how they may conserve while still meeting other business criteria. The decision algorithm, which is more specifically discussed below with respect to FIG. 3, may set business or technical criteria based on importance. Factors such as cost of fragmentation of data, and query time, will be considered to ensure that the most energy efficient location meets those criteria. The logic of the system 30 may be based on algorithms, such as a weighted algorithm method whereby energy efficiency is assigned a weighting, along with other business or technical requirements. The weightings are assigned to each variable to select the optimum location.

A Markov decision process (MDP), which uses a mathematical framework, is another means for providing a decision-making pattern in the process herein. MDPs are useful where outcomes are partly random and partly under the control of the decision maker.

Figure 3:
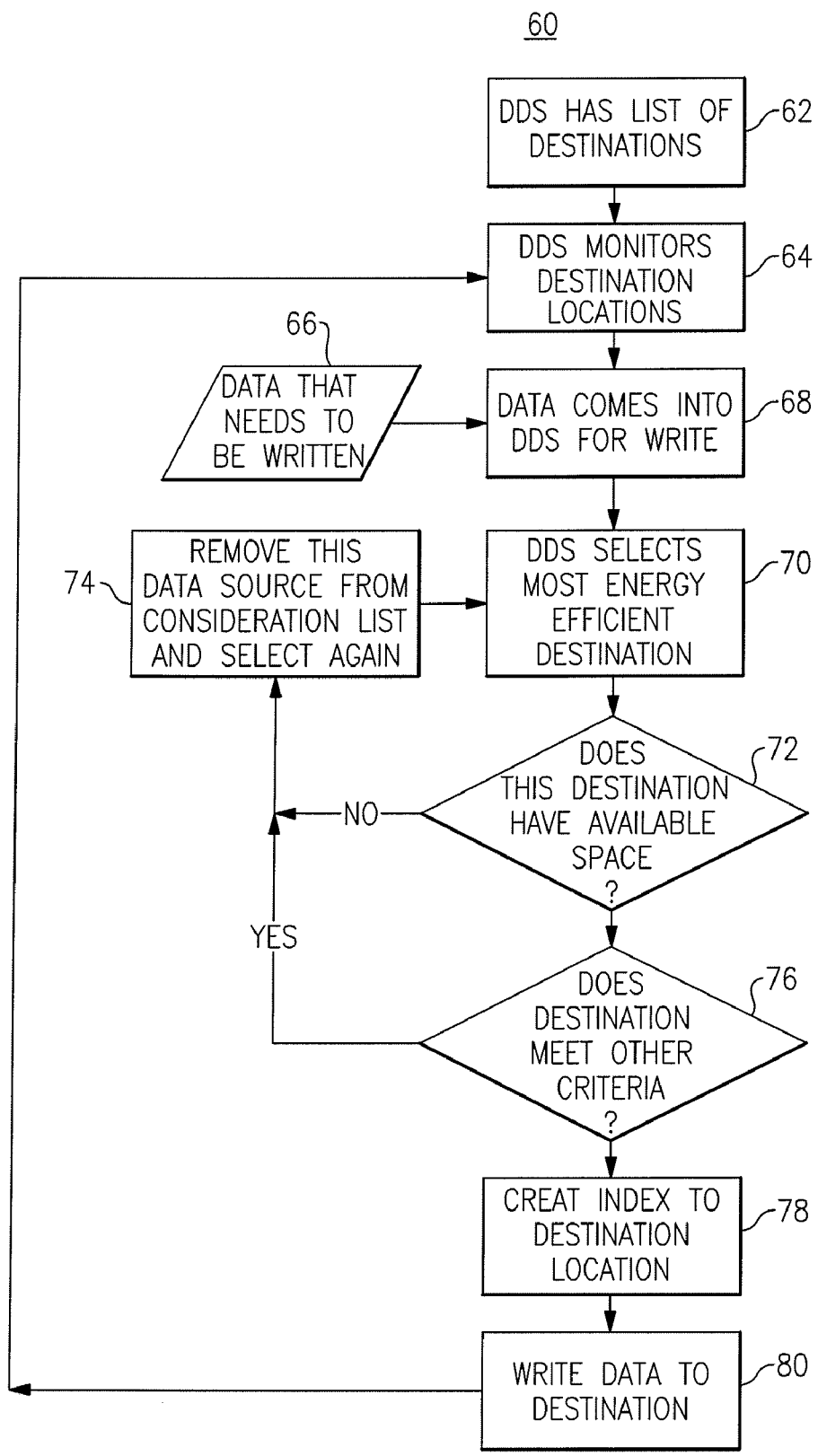
FIG. 3 is a flow chart showing the logic for the data dispatch system of the present invention.

A method embodiment of the invention in relation to FIG. 3 can be performed by system 30 in response to a processor executing an arrangement of instructions contained in a main memory in DDS 32. Such instructions can be read into the main memory from a computer readable medium such as decision system 34. Execution of the arrangement of instructions contained in main memory causes DDS 32 to perform the steps described herein. One or more processors in a multi-processing arrangement may also be employed to execute the instructions contained in the main memory of DDS 32. In alternative embodiments, hard-wired circuitry may be used in place of or in combination with software instructions to implement an embodiment of the present invention. Thus, embodiments of the present invention are not limited to any specific combination of hardware circuitry and software.

The logic 60 of system 30, of initializing data dispatch, will now be described with reference to FIG. 3. According to this embodiment, a list of candidate destinations is established at step 62 by decision system 34 of DDS 32. DDS 32 monitors the destination candidates for power consumption, space restrictions, data usage and requirements, as shown at step 64. Data that needs to be migrated, such as from source 40, 42 or 44 as shown at step 66, is sent to system facility 36 of DDS 32 from an application, as shown at step 68.

DDS 32 evaluates the incoming data and considers all the candidates from the list. At step 70, DDS 32 selects the candidate with the best energy efficiency characteristics for the received data. At step 72, DDS 32 must determine whether the candidate with the best energy characteristics has available space. If there is not enough available space to migrate data to the selected candidate database, this candidate is removed from the list as shown at step 74. The selection process starts over at step 70 and the next best available candidate is selected. If it is determined that there is available space, other predefined criteria are evaluated such as, usage and requirements of the existing stored data in the destination database, as shown in step 76. Other factors to consider include, but are not limited to, time of access, geography of users, frequency of access and number of users. The data to be migrated is compared with the data that exists in the candidate destinations. If there is not enough available space, fragmentation may be considered. The amount of fragmentation that may be necessary is considered along with the cost of reassembly that will be necessary when the data must be combined. A threshold is set in order limit the cost of migration. After all the factors are considered and the cost of migrating the data is greater than the threshold, this candidate must be removed from the list and the selection process begins yet again at step 70.

Once the candidate destination has been selected, DDS 32 creates an index to the destination location at step 78 so that data may be retrieved when needed. DDS then writes the data to the selected destination at step 80. DDS 32 continues to monitor this destination and all other candidates at step 64. The process continues to repeat with new incoming data to DDS at step 68.

In another aspect of the invention, predictive data dispatch methods may be included in the dispatch process of the present invention. One method involves predicting the input of particular data, such as, expecting particular kinds of data at particular times. Certain data environments may require writing data in patterns that are predictable. Nightly batch jobs or seasonal usage patterns may help to determine future data migration needs. DDS 32 can predict when to expect incoming data based on past history, Monte Carlo simulation and other predictive methods. Rather than simply writing data requests as they arrive, future needs may be taken into consideration during the decision process. By factoring this into its decision process, DDS 32 may choose to leave certain destinations available for future, expected incoming data.

Another predictive method involves action by DDS 32 with respect to the status of candidate destinations. DDS 32 may use predictive methods to act proactively before expected data enters. This may include proactive checks of a candidate's availability, calculation of fragmentation and preemptive decision making. In cases where a destination candidate is the most energy efficient choice and size is adjustable, DDS 32 may send a request to increase the available data amount based on incoming workloads. Any known or current methods for requesting allocation of additional space may be used.

Examples of types of databases useful herein as a destination database are set forth in Table 1 below. The parameters set forth in the Table are accessed in order to determine the best possible candidate for the destination database. The power metrics are determined by methods already known, such as nameplate power or power measured from an external power meter.

TABLE 1

Destination Databases

| Database | Location | Storage Type | Vendor/Model | Space Available | Power (watt)/operation | Power used so far (kilowatts) | Max. Power consumption limit (e.g. kilowatts per month) |
| --- | --- | --- | --- | --- | --- | --- | --- |
| 1 | Denver | NAS | Net Apps | 1,300 | 425 | 4000 | 10000 |
| 2 | San Jose | DASD | XYZ | 4,600 | 600 | 7000 | 8000 |
| 3 | Denver | Tape | ABC | 3,900 | 760 | 3500 | 6000 |

Another embodiment of the invention is directed to a medium that is readable by a computer or other device, which includes an executable instruction for initializing data dispatch. In an aspect, the executable instruction involves the process steps 62-80 shown in FIG. 3, as described in detail above. In various aspects, the executable instruction may be in the form of a database utility application, a script-type program, a compiled program, or other suitable forms known in the art.

The term computer-readable medium as used herein refers to any medium that participates in providing an instruction to a computer processor for execution. Such a medium may take many forms, including but not limited to non-volatile media, volatile media, and transmission media. Non-volatile media include, for example, optical or magnetic disks, such as temporary storage device 38. Volatile media include dynamic memory. Transmission media include coaxial cables, copper wire and fiber optics. Transmission media can also take the form of acoustic, optical, or electromagnetic waves, such as those generated during radio frequency (RF) and infrared (IR) data communications. Common forms of computer-readable media include, for example, a hard disc, any magnetic medium, a CD-ROM, CDRW, DVD, any other optical medium, optical mark sheets, and any other physical medium with patterns of holes or other optically recognizable indicia, a RAM, a PROM, an EPROM, a FLASH-EPROM, any other memory chip or cartridge, a carrier wave, or any other medium from which a computer can read.

It should be mentioned that this embodiments discussed herein apply to any and all types of computer data, including but not limited to, relations database management systems (RDMBS), non-relational data, blocks of computer data, application specific computer files such as spreadsheets, word processing documents and the like) and computer executable files.

The invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended embodiments.

What is claimed is:

1. A method for dispatching incoming source data from one or more source databases to one or more destination databases, wherein the source and destination databases carry out one or more transactions, comprising:
    receiving first, second or more incoming sets of source data from one or more source databases into a dispatch server;
    determining a plurality of candidates for the one or more destination databases;
    evaluating the plurality of candidates for the destination database by determining average power consumption per transaction of each candidate;
    selecting a first destination database candidate having lowest power consumption per transaction;
    determining if the selected first destination database candidate has available space for the first, second or more incoming sets of source data;
    if space is available, determining if the selected first destination database candidate meets predefined criteria;
    if the predefined criteria are met, dispatching the first, second or more incoming sets of source data to the selected first destination database candidate;
    continuing to receive new sets of incoming source data; and repeating the method for each new set of incoming source data.

2. The method of claim 1 further comprising:
    removing the selected first destination database candidate from the plurality of candidates if the selected first destination database candidate does not have available space or predefined criteria are no longer met;
    selecting a second destination database candidate having next lowest power consumption per transaction;
    determining if the selected second destination database candidate has available space for the source data;
    if space is available, determining if the selected second destination database candidate meets predefined criteria; and
    if the predefined criteria are met, dispatching the source data to the selected second destination database candidate.

3. The method of claim 2 further comprising:
    removing the selected second destination database candidate from the plurality of candidates if the selected second destination database candidate does not have available space or predefined criteria are no longer met;
    continuing the method with a third, fourth or more destination database candidates until a third, forth or more selected destination database candidate has available space for the source data; and
    if space is available, determining if the selected third, fourth or more destination database candidate meets predefined criteria; and if the predefined criteria are met, dispatching the source data to the selected third, forth or more destination database candidate.

4. The method of claim 1 further comprising:
    identifying the first, second or more incoming sets of source data as (i) real time data; (ii) near-real-time data; or (iii) non-real-time data;
    determining if the first, second or more incoming sets of source data should be dispatched immediately to a final destination database or be dispatched to a temporary storage location; and
    determining duration of time and a temporary storage location if the data should not be dispatched immediately.

5. The method of claim 1 further comprising:
    setting a threshold for a total cost of dispatch of the incoming sets of source data;
    identifying a second cost of dispatch of the incoming sets of source data to each candidate destination;
    determining if the second cost of dispatch to the candidate destination exceeds the threshold of the total cost of dispatch for the incoming sets of source data;
    eliminating the candidate destination if the second cost of dispatch exceeds the threshold of the total cost of dispatch for the incoming sets of source data.

6. The method of claim 1 further comprising;
    creating an index for each set of source data to respective destination database selected therefore for future retrieval.

7. The method of claim 1 further comprising:
    predicting the receipt of future incoming data to the dispatch server;
    including the prediction of the future incoming data in the selection process of the selecting the first destination database candidate;
    selecting an alternate destination database for the first, second or more source data if the prediction of the future incoming data requires dispatch to the first selected destination database candidate.

8. The method of claim 1 further comprising:
    prior to receiving incoming data, proactively checking the plurality of destination database candidates for available space;
    determining the candidates having the lowest power consumption per transaction; and requesting an increase in available space in the candidates having the lowest power consumption per transaction.

9. The method of claim 3 further comprising:
wherein one or more of the each new set of incoming source data belongs with first, second or more incoming source data;
determining if there is available space in the first, second, third, fourth or more destination database where the first, second or more incoming source data is located;
dispatching the one or more new sets of incoming source data to the location of the first, second or more incoming data if space is available;
if space is not available, moving the one or more new sets of incoming source data to the next available destination database candidate having the next lowest power consumption;
creating an index for each of the first, second, or more incoming source data and the one or more of each new set of incoming data of the selected destination database for future retrieval of all data that belongs together.

10. The method of claim 1 further comprising:
if the selected first destination database candidate does not have available space for the first, second, or more incoming source data;
segregating the first, second or more incoming data into one or more segregated data sets;
moving as many as the one or more segregated data sets to the selected first destination database candidate as can fit;
leaving in the dispatch server the one or more segregated data sets that cannot fit in the selected first destination database;
moving the one or more segregated data sets left in the dispatch server to one or more next available destination database candidates having the next lowest power consumption.

11. A system for dispatching incoming data from one or more source databases to one or more destination databases, wherein the source and destination databases carry out one or more transactions, comprising:
one or more source databases;
a plurality of target databases;
a data dispatch server having a decision system, an incoming data receipt facility and a temporary storage device;
wherein the incoming data is received by the incoming data receipt facility and is moved to the temporary storage device;
wherein the decision system evaluates the target databases for power consumption properties and selects first most efficient power consumption target database;
wherein the decision system determines if the first most efficient power consumption target database has available space;
wherein the decision system determines if the first most efficient power consumption target database meets predefined criteria;
wherein the decision system dispatches the incoming source data from the temporary storage device to the first most efficient power consumption target database if there is available space and the predefined criteria are met.

12. The system of claim 11 wherein if the first efficient power consumption target database does not have available space for the incoming source data and/or does not meet the predefined criteria, the decision system determines second most efficient power consumption target database and checks for available space and predefined criteria requirements; and moves to the second most efficient power consumption target database.

13. The system of claim 12 wherein if the available space and predefined criteria requirements are not met, the system continues to evaluate the target databases for third, fourth, or more target databases, until the space availability and predefined criteria requirements are met.

14. The system of claim 13 wherein the data dispatch server creates an index of locations of all dispatched data for easy retrieval.

15. The system of claim 11 wherein the decision system identifies the incoming source data as (i) real time data; (ii) near-real-time data; or (iii) non-real-time data; determines if the incoming source data should be dispatched immediately to a final destination database or be dispatched to a temporary storage location; and determines duration of time and a temporary storage location if the data should not be dispatched immediately.

16. The system of claim 11 wherein the decision system sets a threshold for total cost of dispatching the incoming source data; identifies a second cost of dispatching the incoming source data to each target destination; determines if the second cost of dispatching to the target database exceeds the threshold of the total cost of dispatching for the incoming source data; eliminates the target database if the second cost of dispatching exceeds the threshold of the total cost of dispatching for the incoming source data.

17. The system of claim 11 wherein the decision system predicts the receipt of future incoming data to the dispatch server; includes the prediction of the future incoming data in the selection process of the selecting the first target database candidate; selects an alternate target database for the source data if the prediction of the future incoming data requires dispatch to the first selected target database candidate.

18. The system of claim 11 wherein the decision system, prior to receiving incoming data, proactively checks the plurality of target databases for available space; determines the target databases having the lowest power consumption per transaction; and requests an increase in available space in the target databases having the lowest power consumption per transaction.

19. The system of claim 11 wherein new source data from the one or more source databases continues to enter the incoming data receipt facility;
wherein the decision system determines if the new source data belongs with incoming source data that has been moved to a target database;
wherein the decision system determines if there is available space in the target database wherein the incoming source data has been moved;
wherein the decision system dispatches new source data to the location of the moved source data if space is available;
wherein if space is not available, the decision system moves the new source data to the next available target database having the next lowest power consumption; and
wherein the data dispatch server creates an index for each new source data for future retrieval of all data that belongs together.

20. The system of claim 11 wherein if the selected first most efficient power consumption target database does not have available space for new source data;
the data dispatch server segregates the incoming source data into one or more segregated data sets, moves as many as the one or more segregated data sets to the selected first most efficient power consumption target database that can fit, leaves in the dispatch server the one or more segregated data sets that cannot fit in the selected first target database, and moves the one or more segregated data sets left in the dispatch server to one or more next available target databases having the next lowest power consumption.

21. A computer program product encoded in a computer readable storage medium for instructing a data dispatch server to dispatch incoming source data to a destination database comprising:

instructing the data dispatch sever to receive first, second or more incoming source data;

instructing the data dispatch server to determine a plurality of candidates for the destination database;

instructing the data dispatch server to evaluate the plurality of destination database candidates for power consumption properties to determine most efficient power consumption destination database;

instructing the data dispatch server to determine if the most efficient power consumption destination database has available space;

instructing the data dispatch server to determine if the most efficient power consumption destination database has met predefined criteria;

instructing the data dispatch server to dispatch data to the most efficient power consumption destination database if space is available and predefined criteria has been met.

\* \* \* \* \*